United States Patent [19]
Muehling

[11] Patent Number: 5,131,150
[45] Date of Patent: Jul. 21, 1992

[54] FLEXIBLE SAW

[76] Inventor: Anthony A. Muehling, 14583 Maddelein, Detroit, Mich. 48205

[21] Appl. No.: 683,984

[22] Filed: Apr. 11, 1991

[51] Int. Cl.$^5$ ............................ B23D 45/00; B26D 1/46
[52] U.S. Cl. ........................................ 30/166.3; 83/830
[58] Field of Search ................. 30/166.3; 83/830, 831, 83/832, 833, 834

[56] References Cited

U.S. PATENT DOCUMENTS

| | | | |
|---|---|---|---|
| 432,337 | 7/1890 | Stanley | 83/830 |
| 1,116,881 | 11/1914 | Giampietro | 83/830 |
| 1,229,597 | 6/1917 | Farrer | 83/830 |
| 1,763,095 | 6/1930 | De Haven | 83/832 |
| 3,495,590 | 2/1970 | Zeiller | 30/166.3 |
| 3,747,652 | 7/1973 | Meadows | 30/166.3 |
| 4,518,022 | 5/1985 | Valdes et al. | 30/166.3 |
| 4,762,004 | 8/1988 | Kolve | 83/832 |

Primary Examiner—Douglas D. Watts
Assistant Examiner—Paul M. Heyrana, Sr.
Attorney, Agent, or Firm—Peter D. Keefe

[57] ABSTRACT

A flexible saw blade particularly well suited to the cutting of tree limbs, having a predetermined rivet pressure which assures that just the right degree of rivet pressure will act on transversely adjacent cutting links so that pivoting is easy but not too loose; having teeth pointed in predetermined directions to ensure sufficient kerf width to allow the flexible saw blade to pass through the limb as it cuts and prevents uncut wood from forming a ridge between the rows of cutting links, which would otherwise have the effect of impeding the cutting operation; and having a turn-link optionally incorporated which causes the flexible saw blade to automatically right itself with respect to the limb surface upon being passed over the limb and before actual cutting begins.

18 Claims, 3 Drawing Sheets

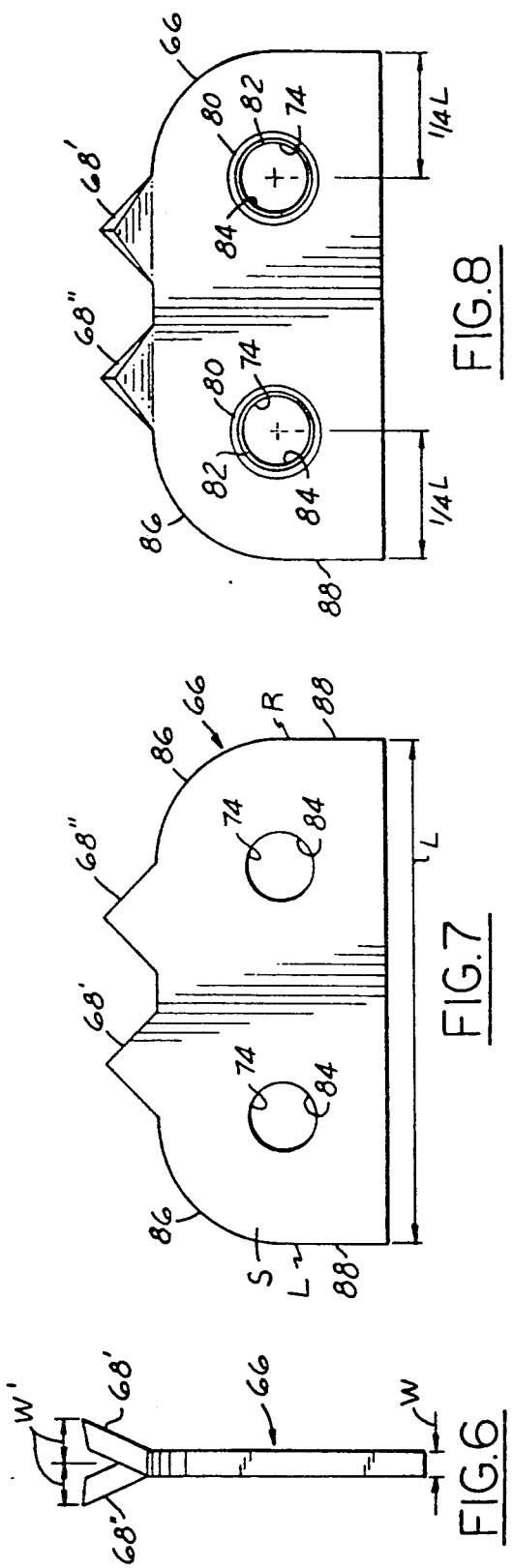
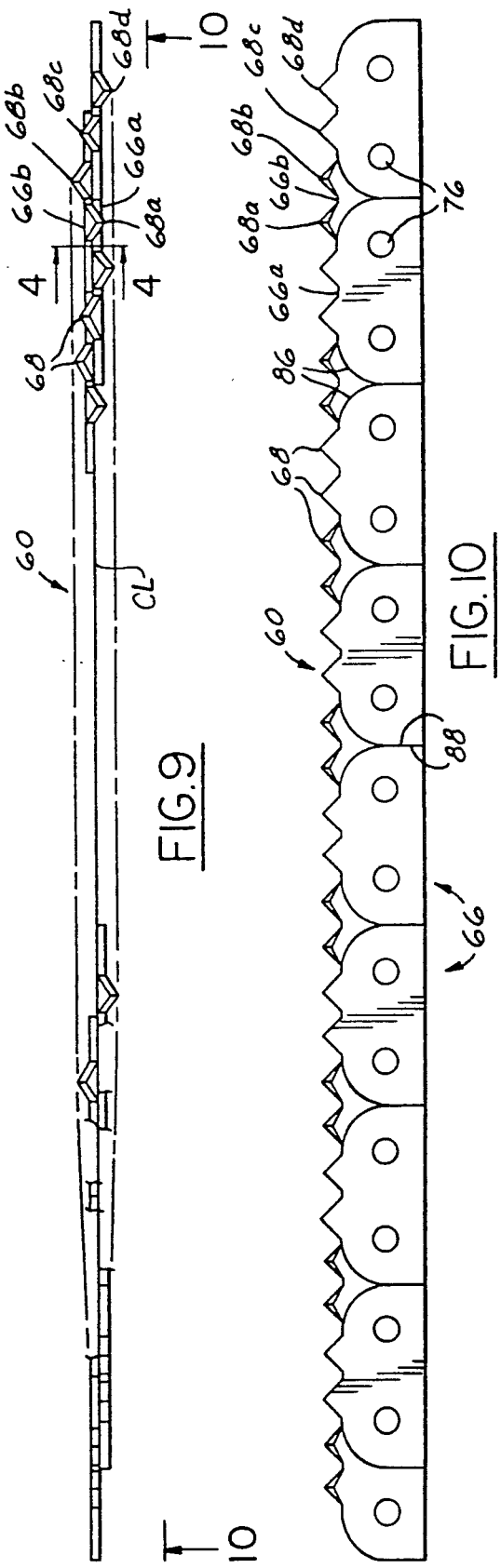

FLEXIBLE SAW

BACKGROUND OF THE INVENTION

1. Field of the Invention

The present invention is related to flexible saws, and in particular is related to an improved saw of this type which is constructed of a plurality of pivotally connected blade links. Still more particularly, the present invention is related to such a saw having overlapping tooth positioning that facilitates sawing, a turn-link connected at one end that assures the teeth of the saw face the wood to be sawed, and a loose riveting that provides efficient operation of the saw.

2. Description of the Prior Art

There are many occasions when wood, particularly tree limbs, must be cut. In the case of cutting tree limbs, it can be both difficult and dangerous to perform the cut, especially in those situations where the limb is located high enough to be unreachable from the ground. There are also situations where someone must cut firewood when on a camping trip, picnic or other outing, and the appropriate saw that would do the job properly is simply too awkward and heavy to pack and carry. Accordingly, what is needed is a compact, lightweight saw which effectively cuts wood of all types and is safe and easy to use in all situations.

In the prior art there are a variety of saws that have been developed to cut limbs. There are two basic classes of saws: those which are powered and those which are operated by hand.

Of the first class of saws, the chain saw has become a familiar tool for the cutting of limbs. But, this kind of saw is heavy, very awkward to carry, and extremely dangerous, especially when cutting limbs located far off the ground. Of the second class of saws, there are several examples.

One kind of saw of the second class is that which enables the user to reach high level limbs via the use of a saw connected with an elongate handle. In this kind of saw, the saw blade reciprocates with respect to the limb by a mechanical linkage system. This kind of saw is represented by U.S. Pat. No. 605,368 to Wrublik, dated Jun. 7, 1898 and by U.S. Pat. No. 3,181,239 to Skok, dated May 4, 1965.

Another kind of saw of the second class is that which has a flexible blade which enables the blade to encircle the limb to be cut. Flexibility of the blade may be provided by either a long twisted blade or a segmented, pivotally interconnected blade. Examples of the twisted blade approach are U.S. Pat. No. 2,749,949 to De La Tramerye, dated Jun. 12, 1956 and U.S. Pat. No. 2,988,118 also to De La Tramerye. A variation thereof is exemplified by U.S. Pat. No. 1,616,880 to Swanstrom, dated Feb. 8, 1927, where disclosed is a resilient wire that is wound with two threads that form teeth, and the resilient wire is reciprocated with respect to a handle connected with each end of the wire. The segmented, pivotally interconnected blade system has proven most effective and efficient, and will now be discussed in particular detail below.

Early examples of the segmented, pivotally interconnected saw blades are U.S. Pat. No. 3,192,973 to O'-Link, dated Jul. 6, 1965, which discloses a flexible blade constructed from a number of interconnected links, each link being provided with teeth members for cutting; and U.S. Pat. No. 3,999,294 to Shoben, dated Dec. 28, 1976, which discloses a flexible blade constructed of a number of blade segments interconnected pivotally with links, the flexible blade being guided around the limb by a curved housing.

While the foregoing examples of flexible saw blades are of interest, none truly is a truly practical saw. Closer to the goal is the segmented, pivotally interconnected saw blade disclosed in U.S. Pat. No. 3,747,652 to Meadows, dated Jul. 24, 1973. Meadows' blade is constructed of a plurality of serially arranged blade segments, overlapping only at the edges and being connected thereat by grommets to provide pivotal function between the blade segments. Ropes connect at the ends of the blade to permit the user to execute reciprocal movement of the blade segments against the limb to be cut.

The saw of Meadows suffers from a number of very significant disadvantages. Among these are difficulty to ensure the cutting teeth engage the limb when the blade is thrown over it and reciprocal movement is engaged, two-way flexibility of the blade making it very difficult to know whether during reciprocation the teeth or the opposite side of the blade segment therefrom is actually engaging the limb, poor pivotability due to the grommets being either too loose or too tight, and inefficient cutting due to the teeth not being positioned for optimal cutting. Also, the blade tends to be excessively transversely bendable, making use somewhat unweildy.

Applicant has sold for over one year a prior art segmented, pivotally interconnected saw blade, shown in FIGS. 14 and 15, which solves some of these problems. In particular, Applicant's prior art flexible saw blade 10 is constructed of a plurality of cutting links 20, arranged in two side-by-side rows. The cutting links 20 are connected together by hollow rivets 22. Each cutting link has two integral teeth 24, and each tooth bends away from the teeth of the adjacent cutting link, as shown best in FIG. 15 in order to provide a kerf wider that the width of the cutting links and the associated hollow rivets. The ends of the cutting links have a curved portion 26 that permits pivoting at the rivets in one direction, and a flat portion 28 which prohibits pivoting in the opposite direction. The hollow rivet 22 has a V-shaped exterior cross-section 30 which mates with a reciprocably shaped hole 32 in adjacent cutting links, thereby retaining the adjacent cutting links in pivotal communication with each other. Because two side-by-side rows of cutting links are used, transverse bending of the blade is quite minimal, thereby making use predictable and easy. Also, because pivotability is in only one direction, the direction necessary for the teeth to engage the limb, the user always knows that the teeth are doing their job as he/she reciprocates the blade relative to the limb.

Now, while Applicant's prior art saw blade is an improvement over all prior devices, including that of Meadows, there yet remains several significant disadvantages that must be solved. For one, there remains the problem of how to assure that just the right degree of rivet pressure will act on adjacent cutting links so that pivoting is easy but not too loose. For another, by pointing the teeth from one another to ensure sufficient kerf width to allow the saw to pass through the limb as it cuts, inefficient cutting occurs due to uncut wood forming a ridge between the teeth of adjacent cutting links after each reciprocation of the blade. Lastly, while the blade may be able to pivot in only one direction, nonetheless, it would be most beneficial for the blade to be caused to automatically right itself with respect to the limb surface upon being passed over the limb and before actual cutting begins.

SUMMARY OF THE INVENTION

The present invention is a flexible saw blade particularly well suited to the cutting of tree limbs, having a predetermined rivet pressure which assures that just the right degree of rivet pressure will act on transversely adjacent cutting links so that pivoting is easy but not too loose; having teeth pointed in predetermined directions to ensure sufficient kerf width to allow the flexible saw blade to pass through the limb as it cuts and prevents uncut wood from forming a ridge between the rows of cutting links, which would otherwise have the effect of impeding the cutting operation; and having a turn-link optionally incorporated which causes the flexible saw blade to automatically right itself with respect to the limb surface upon being passed over the limb and before actual cutting begins.

The present invention is a flexible saw blade of the segmented, pivotally interconnected saw blade type constructed of a plurality of cutting links arranged in two side-by-side rows. The cutting links are connected together by solid rivets, the rivets loosely hold each transversely adjacent cutting link with a precise, predetermined amount of looseness. Each cutting link has preferably two integral teeth, the teeth bending in an alternating pattern so that along the length of the flexible saw blade one tooth of a a cutting link is bent away from the centerline between the two rows of cutting links, while the other tooth is bent toward the centerline. This alternating bending toward and away ensures a sufficiently wide kerf and the prevention of a ridge of uncut wood from being generated between the rows of cutting links. It is preferred that near each end of the flexible saw blade, the teeth not be bent as an aid to start the kerf. The ends of the cutting links have a curved portion that permits pivoting at the rivets in one direction, and a flat portion which prohibits pivoting in the opposite direction. A turn-link is preferred to be provided at at least one end of the blade, the turn-link being of a predetermined curvature that causes the blade to be righted with respect to the teeth and the limb as it is passed over the limb.

Accordingly, it is an object of the present invention to provide a flexible saw blade constructed of two side-by-side rows of cutting links, wherein adjacent cutting links are mutually loosely riveted so as to maximize pivotability and yet be resistive to transverse bending.

It is a further object of the present invention to provide a flexible saw blade constructed of two side-by-side rows of cutting links, wherein adjacent cutting links are mutually loosely riveted so as to maximize pivotability and yet be resistive to transverse bending, and further wherein pivotability is permitted only in one direction.

It is another object of the present invention to provide a flexible saw blade constructed of two side-by-side rows of cutting links, wherein adjacent cutting links are mutually loosely riveted so as to maximize pivotability and yet be resistive to transverse bending, and further wherein pivotability is permitted only in one direction, and still further wherein provision is made to orient the teeth of the cutting links so as to engage a limb to be cut before reciprocable movement brings the teeth into engagement with the limb.

It is yet a further object of the present invention to provide a flexible saw blade constructed of two side-by-side rows of cutting links, wherein teeth are bent in an alternating pattern along the length of the flexible saw blade so that for each cutting link one tooth bends outwardly and one tooth bends inwardly with respect to the centerline between the two rows of cutting links, the resulting kerf being sufficiently wide and material removed therefrom being sufficiently uniform thereacross that cutting is extremely efficient.

It is yet another object of the present invention to provide a flexible saw blade constructed of two side-by-side rows of cutting links, wherein adjacent cutting links are mutually loosely riveted so as to maximize pivotability and yet be resistive to transverse bending by completely overlapping the cutting links.

It is yet another object of the present invention to provide a flexible saw blade constructed of two side-by-side rows of cutting links, wherein adjacent cutting links are mutually loosely riveted so as to maximize pivotability and yet be resistive to transverse bending, which flexible saw blade is suitable for cutting materials in remote locations, such as tree limbs located remote from the user.

It is yet another object of the present invention to provide a flexible saw blade constructed of two side-by-side rows of cutting links, wherein adjacent cutting links are mutually loosely riveted so as to maximize pivotability and yet be resistive to transverse bending, which flexible saw blade is suitable for cutting of many materials including wood, bone, meat and plastics.

These, and additional objects, advantages, features and benefits of the present invention will become apparent from the following specification.

BRIEF DESCRIPTION OF THE DRAWINGS

FIG. 6 is an end view of a cutting link according to the present invention.

FIG. 7 is a side view of a cutting link according to the present invention, showing the side which faces toward the centerline between the rows of cutting links of the flexible saw blade of FIG. 1.

FIG. 8 is a side view of a cutting link according to the present invention, showing the side which faces away from the centerline between the rows of cutting links of the flexible saw blade of FIG. 1.

FIG. 9 is a fragmentary plan view of the flexible saw blade according to the present invention.

FIG. 10 is a fragmentary side view of the flexible saw blade according to the present invention, seen along lines 10—10 in FIG. 9.

FIG. 14 is a fragmentary side view of the prior art flexible saw blade and FIG. 15 is an end view thereof seen along lines 15—15 in FIG. 14.

DETAILED DESCRIPTION OF THE PREFERRED EMBODIMENT

Figures 1, 4, 5:
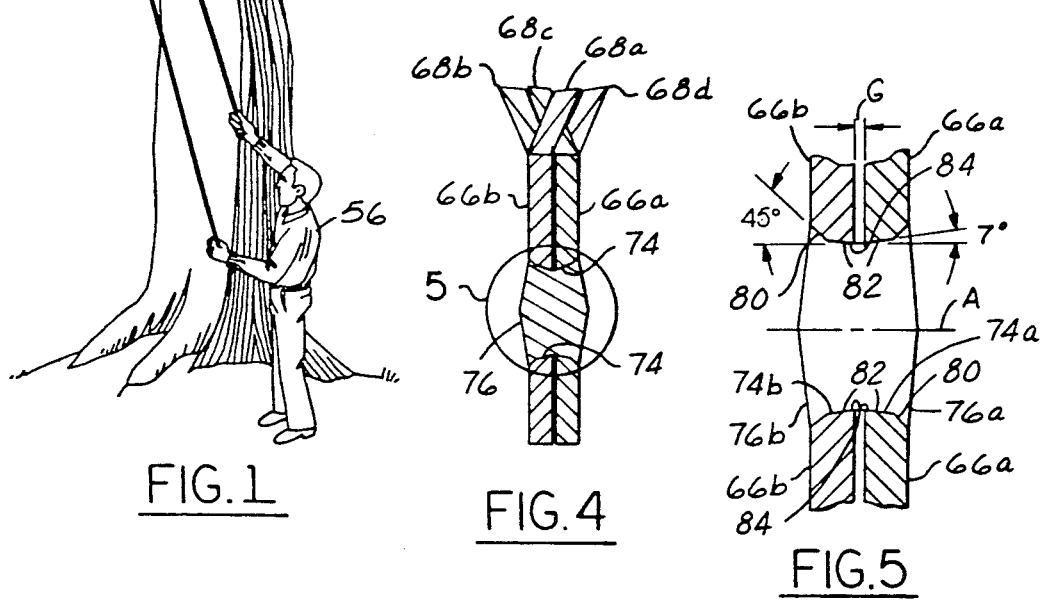
FIG. 1 is a perspective view of the flexible saw blade according to the present invention shown in operation conveniently and efficiently cutting a tree limb that is located high off the ground.
FIG. 4 is a sectional view of the flexible saw blade according to the present invention, seen along lines 4—4 in FIG. 9.
FIG. 5 is a detail view of the area shown in circle 5 of FIG. 4.

Referring now to the Drawing, FIG. 1 shows the flexible saw 50 according to the present invention in operation being used to cut a limb 52 off a tree 54 at a rather high distance from the ground in relation to the height of the user 56. It will be noticed from an examination of the depiction, that the saw has generated a kerf 58 in the limb. As will be made clear by the discussion hereinbelow, a reciprocable motion of the flexible saw 50 causes the teeth located on the flexible saw blade 60 of the flexible saw to cut through the limb, eventually severing it from the tree. This process is facilitated by extension members 62, preferably in the form of chords, cables, ropes or the like, one of which being located on each end of the flexible saw blade, which provide easy handling of the movement of the flexible saw by the user, one being associated with each hand as shown. The extension members may be connected with the ends of the flexible saw blade 60 by a releasable device, such as hooks. It is further preferred to include at least one turn-link 64. The turn link is located between the end of the flexible saw blade 60 and the respective extension member. Again, connection of the turn-link may be by any convenient device, such as hooks. Thusly, the flexible saw 50 is composed of a flexible saw blade 60, and preferably, extension members 62 at each end of the flexible saw blade and at least one turn-link 64 connected between the flexible saw blade and the respective extension member.

Turning attention now to the specifics of the structure and function of the flexible saw blade 60 according to the present invention, attention is particularly requested with respect to FIGS. 2 through 10.

Figure 3:
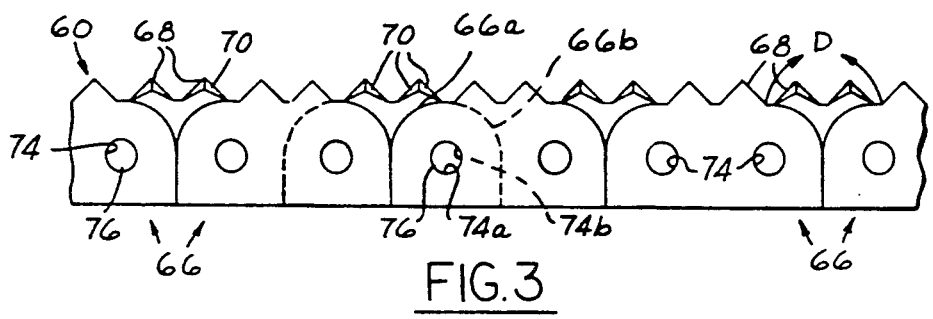
FIG. 3 is a fragmentary side view of the flexible saw blade according to the present invention.

As illustrated in FIG. 3, the flexible saw blade 60 is composed of a number of substantially identical cutting links 66, arranged in two side-by-side rows, with transversely adjacent cutting links, where the term "transversely adjacent" refers to a cutting link of one row that is adjacent to a cutting link of the other row. The transversely adjacent cutting links are pivotally connected together in a mutually staggered relationship. One side of the cutting links is provided with teeth 68, with preferably two teeth being provided per cutting link 66. The teeth have sharp faces 70 for interacting cuttably with a material, such as wood. The teeth 68 are preferred to have a point 68', with a face on either side of the point comprising the faces 70. The faces are preferred to be located on the side of the tooth side facing the other row of cutting links. The faces are preferred to be formed by a grinding process. The height and specific shape of the teeth are such as to facilitate cutting of the intended material, such as tree limbs, animal body parts, etc. It is desirable that there be a large number of cutting links of relatively small length L so as to maximize flexibility of the flexible saw blade as it conforms to the curvature of a material being cut, such as a more-or-less round tree limb.

Each cutting link is proved with a pair of holes 74, each hole having a specific geometry that reciprocably mates with a rivet 76. The holes are displaced from one another substantially one-half the length L, that is, one hole is located substantially one-quarter L from the left side L and the other hole is located one-quarter L from the right side R of the cutting link 66, as shown in FIGS. 7 and 8. The location of the holes is such to connect the cutting links together so that the two rows will completely overlap one another in the manner depicted in FIG. 3, which is important in terms of stiffness and pivot control, as will be made clearer hereinbelow. The rivet 76 pivotally connects transversely adjacent cutting links via alignment of holes 74 between the cutting links, where a right-side hole of one cutting link is aligned with a left-side hole of its transversely adjacent cutting link, and so on. That is, referring to FIG. 3, hole 74a of cutting link 66a of one row is pivotally connected with hole 74b of cutting link 66b of the other row, and so on along the entire length of the flexible saw blade 60.

The surface S of each cutting link is flat, and this is the surface facing the centerline between the rows of cutting links. Since the location of each hole is one-quarter L from each end, the cutting links completely overlap each other in a staggered relationship. In this regard, since there is a substantial portion of each cutting link between the hole and its respective end, there is provided a lever arm which cooperates with the rivet through the hole to thereby provide excellent resistance to transverse bending of the flexible saw blade 60.

The specific geometry of the holes 74 and the rivets 76 are such as to provide for a loose riveting that allows for pivotable interconnection between the cutting links that permits free pivotal movement and yet not have too much play that operation of the cutting action of the teeth is impaired. This geometry is discussed immediately hereinbelow.

The hole 74 is cut so that an outer portion thereof has a radial taper of 45 degrees relative to a line parallel with the hole axis A, hereinafter referred to as the 45 degree taper portion 80. Immediately adjacent thereto toward the opposite side of the cutting link 66, is a taper of substantially 7 degrees with respect to a line parallel with the hole axis A, hereinafter referred to as the 7 degree taper portion 82. Cutting links 66a and 66b are arranged so that the 7 degree taper portions 82 immediately face each other, as shown most particularly in FIG. 5. The rivet is placed into the holes 74a and 74b and shaped by a machine process, such as for instance a spin process, so that the rivet conforms to the geometry of the holes 74a and 74b, yet there is provided between the cutting links 66a and 66b a small gap G, on the order of about 0.001 or 0.002 inches. Accordingly, the 45 degree taper portion 80 of each hole 74a, 74b serves to mechanically interact with the respective adjacent rivet head 76a, 76b to hold the transversely adjacent cutting links together, and the substantially 7 degree taper portion 82 serves to provide a bearing surface between the rivet and the cutting link for ease of pivoting during operation. Further, the 7 degree taper portion provides for maintaining proper looseness of riveting by shifting the rivet a slight amount after one side of the rivet has been headed by the machine process. It is preferred that the hole 74 be provided by a straight punch and that the 45 and 7 degree taper portions be provided by a finishing process. It is acceptable, and indeed preferred, for the hole 74 have a straight portion 84 oriented parallel with the hole axis A at the hole opening located next to its transversly adjacent cutting link. Thus, the hole 74 would, across the width W of the cutting link, be composed of straight, 7 degree taper and 45 degree taper portions. The interaction of this geometry with respect to the rivet and the hole provides for free pivoting of the flexible saw blade around a tree limb, yet maintains a very high degree of tensile strength. Further still the surface geometry of the holes and rivets serves to distribute shear forces developed therebetween during cutting. It is to be understood by those of ordinary skill in the art, that the herein recited angles of taper of the hole 74 are preferred, and that taper angles other than these may be substituted within the functional parameters set forth in this disclosure for the flexible saw blade.

Figure 2:
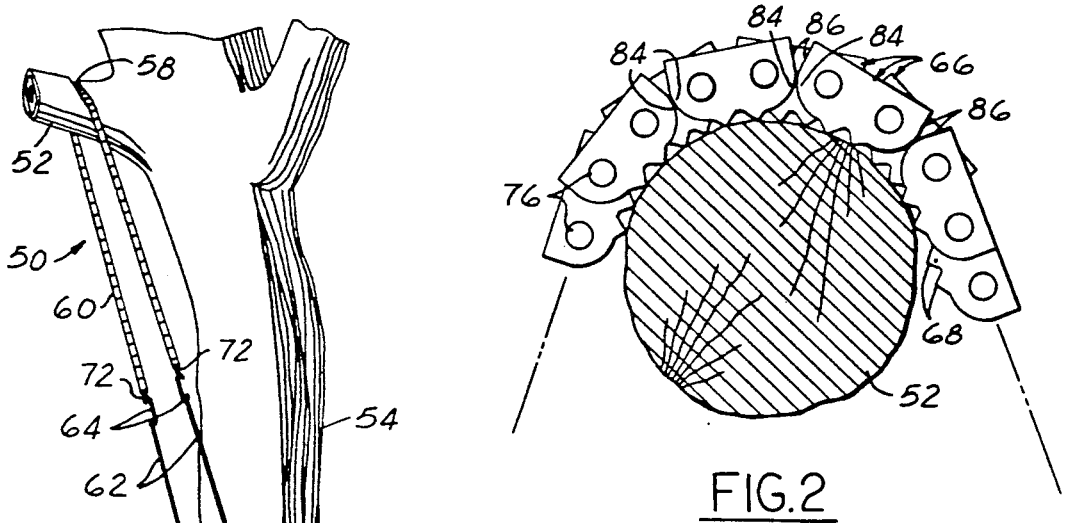
FIG. 2 is a detail side view of the flexible saw blade according to the present invention shown in operation with respect to a tree limb.

It will be particularly seen from FIG. 2 that the cutting links 66 are pivotally connected as indicated above utilizing holes 74 and rivets 76, so that pivoting is possible in only one direction. This direction D, indicated in FIG. 3, is such as to allow the cutting links 66 to mutually pivot in the direction in which the teeth 68 face. This feature is shown in operation in FIG. 2, and is effected by providing a rounded corner 86 at each right and left end of the cutting links 66 adjacent the teeth 68, and a flat surface 88 at each right and left corner opposite the teeth, the cutting links only being able to turn at the rounded corners 86.

In order that cutting proceed easily and effectively, it is necessary that the teeth engage the material to be cut in a manner that ensures the teeth will remove all the material in the kerf and that the sides of the flexible saw blade will not unduly rub against the edges of the kerf as the flexible saw blade penetrates into the material.

As indicated in FIG. 6, each tooth 68 of each cutting link 66 is bent in a mutually opposite direction. It is preferred that each tooth be bent substantially an equal amount, the amount of the bend of each tooth being indicated by W' in FIG. 6. The cutting links 66 are assembled as shown in FIGS. 9 and 10 so that the 45 degree taper portions 80 of holes 74 are mutually facing away from one another. In this configuration, and after riveting, teeth will alternate in bend direction along the flexible saw blade 60. The pattern is indicated jointly by FIGS. 4 and 9, where the bend of serially arranged teeth 68a, 68b, 68c and 68d are clearly shown. Note that the collective bend of teeth 68b and 68d define the width of cut of the kerf, a distance generally equal to 2W'+G, and sufficient to provide clearance in the kerf for the rivet heads 76a, 76b. Note further that the bend of teeth 68a and 68c is such as to cross over the centerline CL between the rows. Thus, what is most importantly indicated by FIG. 4, is that, as the teeth engage the material to be cut, the particular bend of particular teeth will be such that teeth engage material within the entire kerf width. This feature prevents ridge build-up at the centerline between the rows as the flexible saw blade 60 performs its cutting function.

As indicated by FIG. 9, it is preferred that the teeth adjacent each end 72 of the flexible saw blade 60 not be bent and that thereafter progressive amounts of bend be provided until full bend is provided along the majority of the length of the flexible saw blade. By example, the first three cutting links would have straight teeth, while the next four cutting links would have progressively increasing bend on the teeth. By providing minimal tooth bending at the end of the flexible saw blade, the kerf is more easily established in the material to be cut.

Figure 11:
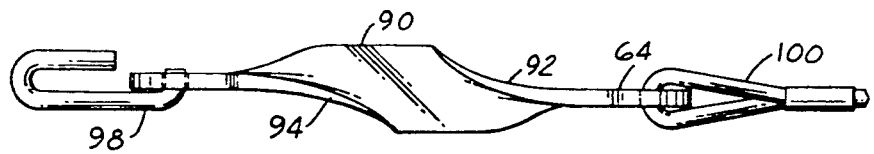
FIG. 11 is a plan view of a turn-link according to the present invention.
Figure 12:
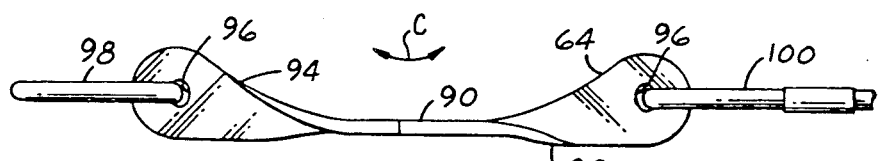
FIG. 12 is a side view of the turn-link according to the present invention.

As particularly shown in FIGS. 11 and 12, the turn-link 64 is preferred to be shaped with a relatively flat middle section 90 and a pair of integrally formed twisted end portions 92, 94, wherein the twist is substantially 90 degrees relative to the flat middle section, and further wherein one side has a profile that is characterized by a general curvature C. One of the twisted end portions is structured to be received by an end 72 of the flexible saw blade 60, while the other of the twisted end portions is structured to receive one of the extension members 62. As depicted in FIGS. 11 and 12, these structures are preferred to be end holes 96, one for receiving a hook 98 and the other for receiving a loop 100 of an extension member The turn-link shape is such as to always present a same relative orientation with respect to the material to be cut after it has been slid thereover. Accordingly, the flexible saw blade is attached to the turn-link so that the teeth 68 are always presented to the material upon passage of the turn-link over the material to be cut. This feature ensures that the teeth will always be present to the material to be cut, a particularly useful feature when cutting limbs very high off the ground.

In typical operation of the flexible saw 50, an extension member is thrown over a tree limb. As the user pulls on this extension member, the tree limb encounters the turn-link. The turn-link presents itself to the tree limb along one twisted end portion, then the flat middle portion, then the other twisted end portion. Upon disengagement of the turn-link from the tree limb, the teeth of the flexible saw blade are facing toward the tree limb. Now the flexible saw blade commences engagement with the limb. Firstly the first portion of the flexible saw blade having straight teeth starts the kerf, then the second portion of the flexible saw blade having increasingly bent teeth encounters the limb thereby deepening and widening the kerf, finally the fully bent teeth encounter the limb and do the job of cutting through the limb. With the double rows of cutting links providing excellent resistance to bending, the loose riveting of the cutting links providing very responsive pivoting so as to permit the teeth to everywhere follow the contour of the object being cut, and the tooth bends of each cutting link collectively providing removal of all material within the kerf, a fast, efficient and remarkably easy cut is made in the limb with minimum of toil for the user.

Figure 13:
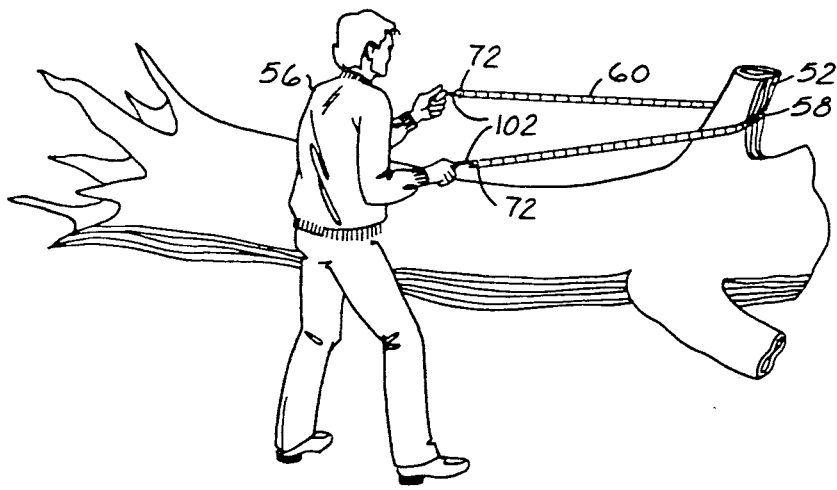
FIG. 13 is a perspective view of another configuration of the flexible saw according to the present invention, shown in operation.
Figure 14:
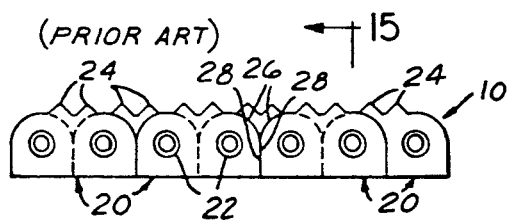
FIGS. 14 and 15 are views of a prior art flexible saw blade of the inventor, where
Figure 15:
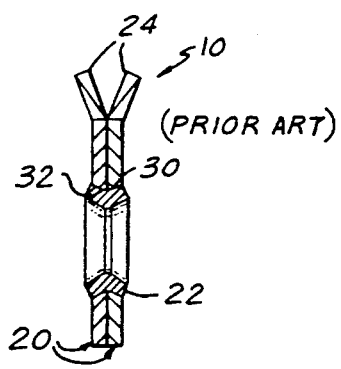

Alternatively, the flexible saw may not need to use the extension members 62 or the turn-link 64 because the cutting job is located very close to the user. In this case, as depicted in FIG. 13, handles 102 are connected at each end 72 of the flexible saw blade 60.

To those skilled in the art to which this invention appertains, the above described preferred embodiment may be subject to change modification. Such change or modification can be carried out without departing from the scope of the invention, which is intended to be limited only by the scope of the appended claims.

What is claimed is:

1. A flexible saw for cutting a material, the material having a surface contour, said flexible saw comprising:
a flexible saw blade, comprising:
a plurality of cutting links, each cutting link having a right end defining a right end portion thereof, a left end defining a left end portion thereof, and a toothed end located between said right and left ends, each cutting link having a first side and an opposite second side, each cutting link further having at least one tooth projecting from said toothed end, said cutting links being arranged in a serial manner with all toothed ends oriented similarly so as to form a saw blade of elongate shape having a first end and a second end in which serially the right end portion of one cutting link overlaps the left end portion of a transversely adjacent cutting link; and cutting link connection means for pivotally connecting together said cutting links at each location where each said cutting link overlaps another said cutting link so that the saw blade formed by said plurality of cutting links may flex in order for the toothed end of the cutting links in adjacency with the material to generally follow the surface contour of the material; and movement transfer connection means for connecting said first and second ends of said saw blade to a source of movement;

wherein a centerline is defined between the two rows of cutting links, further wherein a predetermined number of teeth are sequentially alternately bent in a first direction then bent in an opposite second direction, said first direction being toward said centerline, said second direction being away from said centerline, the teeth bent toward said centerline being bent sufficiently to bend over said centerline, the teeth bent away from said centerline collectively defining a width that is wider than any other width of said saw blade.

2. The flexible saw blade of claim 1, wherein said cutting link connection means comprises:

a right end hole in said right end portion of each said cutting link;

a left end hole in said left end portion of each said cutting link, said right end hole being aligned with said left hand hole at each location of overlap between transversely adjacent cutting links; and a rivet disposed through each of said right end hole and said left end hole at each said location of overlap between transversely adjacent cutting links.

3. The flexible saw blade of claim 2, wherein each said cutting link has a length along said toothed end, said right end hole being located substantially one-quarter of said length from said right end, said left end hole being located substantially one-quarter of said length from said left end, wherein serial alignment of said right end hole with said left end hole of said plurality of cutting links results in two rows of cutting links in which each cutting link of one row overlaps one-half of each of two cutting links of the other row except at said first and second ends of said saw blade.

4. The flexible saw blade of claim 3, further comprising pivot control means connected with said right and left ends of said cutting links for permitting said saw blade to flex in one direction only, said direction being that which permits the toothed end of the cutting links in adjacency with the material to generally follow the surface contour of the material.

5. The flexible saw blade of claim 4, wherein said right end hole and said left end hole each have a respective hole axis, said cutting link connection means further comprising:

a first taper portion of said right end hole located at said first side of said cutting link, said first taper portion of said right end hole being oriented at a first predetermined angle relative to the hole axis of said right end hole;

a second taper portion of said right end hole located adjacent said first taper portion of said right end hole, said first taper portion of said right end hole being oriented at a second predetermined angle relative to the hole axis of said right end hole;

a first taper portion of said left end hole located at said first side of said cutting link, said first taper portion of said left end hole being oriented at a first predetermined angle relative to the hole axis of said right end hole;

a second taper portion of said left end hole located adjacent said first taper portion of said left end hole, said first taper portion of said left end hole being oriented at a second predetermined angle relative to the hole axis of said right end hole; and a surface geometry on said rivet which reciprocally matches said first taper portion of said right end hole, said second taper portion of said right end hole, said first taper portion of said left end hole and said second taper portion of said left end hole;

wherein at each said location where each said cutting link overlaps another said cutting link whereat said right end hole is aligned with said left end hole, said first taper portions thereof mutually face away from each other.

6. The flexible saw blade of claim 5, wherein said rivet substantially loosely engages said first taper portions of each of said left and right end holes.

7. The flexible saw blade of claim 6, wherein said substantially loose engagement of said rivet with said first taper portions of each of said left and right end holes provides a gap between the rows of cutting links of substantially between 0.001 and 0.002 inches.

8. The flexible saw blade of claim 7, wherein said first predetermined angle of said first taper portion of said right end hole is substantially 45 degrees, said first predetermined angle of said first taper portion of said left end hole is substantially 45 degrees, said first predetermined angle of said second taper portion of said right end hole is substantially 7 degrees, said first predetermined angle of said second taper portion of said left end hole is substantially 7 degrees.

9. The flexible saw blade of claim 8, wherein said cutting link connection means further comprises:

a straight portion of said right end hole located adjacent said second taper portion of said right end hole and at said second side of said cutting link, said straight portion being oriented parallel with respect to the hole axis of said right end hole;

a straight portion of said left end hole located adjacent said second taper portion of said right end hole and at said second side of said cutting link, said straight portion being oriented parallel with respect to the hole axis of said left end hole; and a surface geometry on said rivet which reciprocally matches said straight portion of said right end hole and said straight portion of said right end hole;

wherein at each said location where each said cutting link overlaps another said cutting link whereat said right end hole is aligned with said left end hole, said straight portions thereof mutually face toward each other.

10. The flexible saw of claim 9, wherein a first portion of said saw blade at each of said first and second ends thereof has a first predetermined number of cutting links having unbent teeth; wherein a second portion of said saw blade adjacent each of said first portions thereof has a second predetermined number of cutting links having increasingly bent teeth with distance from said first portions, wherein said predetermined number of bent teeth are connected to cutting links located between each location of said second portion of said saw blade.

11. The flexible saw of claim 10, wherein each said cutting link has two teeth, each cutting link having bent teeth having one tooth being bent in said first direction and the other tooth bent in said second direction.

12. The flexible saw of claim 11, further comprising turn-link means connected to one of said first and second ends of said saw blade for being slid over the surface contour of said material to thereby cause the toothed end of the cutting links adjacent said material to face toward the surface.

13. The flexible saw of claim 12, wherein said turn-link means comprises:
  a first end portion;
  a second end portion;
  a middle portion integrally connected at one end with said first portion and integrally connected at said the other end to said second end portion, wherein said first end portion is twisted substantially 90 degrees in a first direction with respect to said middle portion, wherein further said second end is twisted substantially 90 degrees in a second direction with respect to said middle portion, said first end portion, said second end portion and said middle portion forming a generally C-shaped curvature;
  saw blade connection means on one of said first and second end portions for connecting with one of said first and second ends of said saw blade in a predetermined orientation with respect thereto; and
  connection means on the other of said first and second end portions for connecting with said movement transfer connection means.

14. A flexible saw for cutting a material, the material having a surface contour, said flexible saw comprising:
  a flexible saw blade, comprising:
    a plurality of cutting links, each cutting link having a right end defining a right end portion thereof, a left end defining a left end portion thereof, and a toothed end located between said right and left ends, each cutting link having a first side and an opposite second side, each cutting link further having at least one tooth projecting from said toothed end, said cutting links being arranged in a serial manner with all toothed ends oriented similarly so as to form a saw blade of elongate shape having a first end and a second end in which serially the right end portion of one cutting link overlaps the left end portion of a transversely adjacent cutting link; and
    cutting link connection means for pivotally connecting together said cutting links at each location where each said cutting link overlaps another said cutting link so that the saw blade formed by said plurality of cutting links may flex in order for the toothed end of the cutting links in adjacency with the material to generally follow the surface contour of the material, said cutting link connection means further comprising:
      a right end hole in said right end portion of each said cutting link;
      a left end hole in said left end portion of each said cutting link, said right end hole being aligned with said left hand hole at each location of overlap between transversely adjacent cutting links;
      a rivet disposed through each of said right end hole and said left end hole at each said location of overlap between transversely adjacent cutting links;
      a first taper portion of said right end hole located at said first side of said cutting link, said first taper portion of said right end hole being oriented at a first predetermined angle relative to the hole axis of said right end hole;
      a second taper portion of said right end hole located adjacent said first taper portion of said right end hole, said first taper portion of said right end hole being oriented at a second predetermined angle relative to the hole axis of said right end hole;
      a first taper portion of said left end hole located at said first side of said cutting link, said first taper portion of said left end hole being oriented at a first predetermined angle relative to the hole axis of said right end hole;
      a second taper portion of said left end hole located adjacent said first taper portion of said left end hole, said first taper portion of said left end hole being oriented at a second predetermined angle relative to the hole axis of said right end hole; and
      a surface geometry on said rivet which reciprocally matches said first taper portion of said right end hole, said second taper portion of said right end hole, said first taper portion of said left end hole and said second taper portion of said left end hole;
      wherein at each said location where each said cutting link overlaps another said cutting link whereat said right end hole is aligned with said left end hole, said first taper portions thereof mutually face away from each other; and
  movement transfer connection means for connecting said first and second ends of said saw blade to a source of movement.

15. The flexible saw of claim 14, wherein a centerline is defined between the two rows of cutting links, further wherein a predetermined number of teeth are sequentially alternately bent in a first direction then bent in an opposite second direction, said first direction being toward said centerline, said second direction being away from said centerline, the teeth bent toward said centerline being bent sufficiently to bend over said centerline, the teeth bent away from said centerline collectively defining a width that is wider than any other width of said saw blade.

16. The flexible saw blade of claim 15, wherein each said cutting link has a length along said toothed end, said right end hole being located substantially one-quarter of said length from said right end, said left end hole being located substantially one-quarter of said length from said left end, wherein serial alignment of said right end hole with said left end hole of said plurality of cutting links results in two rows of cutting links in which each cutting link of one row overlaps one-half of each of two cutting links of the other row except at said first and second ends of said saw blade.

17. The flexible saw blade of claim 16, further comprising pivot control means connected with said right and left ends of said cutting links for permitting said saw blade to flex in one direction only, said direction being that which permits the toothed end of the cutting links in adjacency with the material to generally follow the surface contour of the material.

18. A device for causing a predetermined surface of a first object to be oriented in a predetermined direction relative to a surface of a second object after the device has been caused by a source of movement to be slid over the surface of the second object, said device comprising:

a first end portion;

a second end portion;

a middle portion integrally connected at one end with said first portion and integrally connected at said the other end to said second end portion, wherein said first end portion is twisted substantially 90 degrees in a first direction with respect to said middle portion, wherein further said second end is twisted substantially 90 degrees in a second direction with respect to said middle portion, said first end portion, said second end portion and said middle portion forming a generally C-shaped curvature;

first connection means on one of said first and second end portions for connecting with said first object in a predetermined orientation with respect to said predetermined surface thereof; and second connection means on the other of said first and second end portions for connecting with the source of movement;

wherein the device is slid over the surface of the second object to thereby cause the predetermined surface of the first object to be oriented in the predetermined direction with respect to the surface of the second object.

* * * * *